United States Patent
Eiselt et al.

(10) Patent No.: US 9,219,523 B2
(45) Date of Patent: Dec. 22, 2015

(54) METHOD AND DEVICE FOR TRANSMITTING AN OPTICAL DIGITAL WDM SIGNAL OVER AN OPTICAL TRANSMISSION LINK OR A PASSIVE OPTICAL NETWORK

(71) Applicant: ADVA Optical Networking SE, Meiningen (DE)

(72) Inventors: Michael Eiselt, Kirchheim (DE); Stephan Pachnicke, Dortmund (DE)

(73) Assignee: ADVA Optical Networking SE, Meiningen (DE)

(*) Notice: Subject to any disclaimer, the term of this patent is extended or adjusted under 35 U.S.C. 154(b) by 72 days.

(21) Appl. No.: 14/081,756

(22) Filed: Nov. 15, 2013

(65) Prior Publication Data

US 2014/0140699 A1     May 22, 2014

(30) Foreign Application Priority Data

Nov. 16, 2012   (EP) ..................................... 12007779

(51) Int. Cl.
*H04B 3/32*      (2006.01)
*H04J 14/02*     (2006.01)
*H04J 14/06*     (2006.01)

(52) U.S. Cl.
CPC . *H04B 3/32* (2013.01); *H04J 14/02* (2013.01); *H04J 14/0208* (2013.01); *H04J 14/06* (2013.01)

(58) Field of Classification Search
None
See application file for complete search history.

(56) References Cited

U.S. PATENT DOCUMENTS

| | | | |
|---|---|---|---|
| 5,892,858 A | 4/1999 | Vaziri et al. | |
| 6,363,181 B1 | 3/2002 | Chraplyvy | |
| 7,382,984 B2 | 6/2008 | McNicol et al. | |
| 2003/0025971 A1* | 2/2003 | Price et al. | 359/181 |
| 2004/0197103 A1* | 10/2004 | Roberts et al. | 398/159 |
| 2004/0208614 A1* | 10/2004 | Price | 398/152 |
| 2011/0249978 A1* | 10/2011 | Sasaki | 398/140 |

FOREIGN PATENT DOCUMENTS

GB       2 421 649 A      6/2006

* cited by examiner

*Primary Examiner* — Darren E Wolf
(74) *Attorney, Agent, or Firm* — The Culbertson Group, P.C.

(57) ABSTRACT

Arrangement for transmitting an optical digital WDM signal over an optical transmission link or a passive optical network, the signal ($S_{WDM}$) including N optical channels matching a given optical frequency grid. The scheme includes supplying the WDM signal ($S_{WDM}$) to a near end of the optical transmission link or a near end of the passive optical network; receiving the WDM signal ($S_{WDM}$) at a far end of the optical transmission link or at one or more far ends of the passive optical network; separating the optical channel signals ($s_i(t)$) by splitting and bandpass filtering the WDM signal ($S_{WDM}$) received; and converting the optical channel signals ($s_i(t)$) into electrical channel signals using direct optical detection. The signal ($S_{WDM}$) is created such that neighboring channel signals ($s_i(t)$) are orthogonally polarized and are conditioned with specific pre-distortion.

18 Claims, 6 Drawing Sheets

METHOD AND DEVICE FOR TRANSMITTING AN OPTICAL DIGITAL WDM SIGNAL OVER AN OPTICAL TRANSMISSION LINK OR A PASSIVE OPTICAL NETWORK

FIELD OF THE INVENTION

The invention relates to a method for transmitting an optical digital wavelength division multiplex (WDM) signal over an optical transmission link or a passive optical network. Moreover, the invention relates to an optical WDM transmitter device and to an optical WDM transmission system.

BACKGROUND

In densely spaced WDM transmission systems, two main distortions affect the signal: inter-symbol interference induced by tight filtering and crosstalk between neighboring channels.

Previously, the value of the channel spacing or grid spacing in conventional WDM transmission systems is usually chosen to be slightly higher than the value of the bitrate of the channel signal included within the individual channels, e.g. a channel spacing of 50 GHz is usually used for 43 Gb/s channel signals or for a 112 Gb/s polmux-QPSK channel signal (i.e. a channel signal using a quaternary phase-shift keying modulation method in which each modulation symbol is present in two different polarization states).

For future transmission systems, an even closer channel spacing is envisioned. Optical WDM transmission systems which transmit four duobinary modulated channel signals at a bitrate of 28 Gb/s on a 50 GHz grid are already available. Optical duobinary modulation may be used as disclosed in U.S. Pat. No. 5,892,858, which is spectrally more efficient and also more cost efficient than above polmux systems as direct detection at the receiver side can be used. Furthermore, electrical pre-distortion may be utilized to pre-compensate transmission distortions (see e.g. No. U.S. Pat. No. 7,382,984 B2 for dispersion pre-compensation). Pre-distortion methods have the advantage that complexity is lower than in case of methods using post-compensation of distortions (at the receiver). In the light of crosstalk reduction between WDM channels, also orthogonal polarization launch has been proposed for reduction of nonlinear fiber effects like four photon mixing (FPM) (see e.g. U.S. Pat. No. 6,363,181 B1). However, this application of orthogonally polarized neighboring optical channel signals within a WDM signal is used for reduction of nonlinear crosstalk, which occurs on multi-span transmission systems using low dispersion fibers.

SUMMARY OF THE INVENTION

One goal of the present invention is to provide improved methods for transmitting an optical digital wavelength division multiplex (WDM) signal over an optical transmission link or a passive optical network and for directly detecting the channel signals at respective receiving points, the improved method allowing to reduce the grid spacing without increasing the cross-talk between the channels or to reduce the channel cross-talk without the necessity of increasing the grid spacing. Another goal is to provide an optical WDM transmitter device and an optical WDM transmission system for realizing methods according to invention.

Generally the invention is applied where an orthogonal polarization of neighboring channels is employed to reduce cross-talk. According to a preferred embodiment of the invention, pre-distortion is applied for creating the optical channel signals by adding a pre-distortion signal to a respective digital modulation data signal which is used for creating the respective optical channel signal, the pre-distortion signal including at least one pre-distortion component depending on the optical channel signal of a neighboring channel. This approach is to pre-compensate for inter-channel crosstalk at the transmitter to allow tighter channel spacing or to improve the signal-to-noise ratio. As at the receiver, in the case of direct detection (which is often preferable due to cost considerations), the amplitude of the incoming signals is squared, nonlinear crosstalk will occur. If, however, orthogonal polarization launch is used, linear pre-distortion is sufficient.

In a further embodiment, the at least one pre-distortion component determined is dependent on the overlap of the spectral optical filter function used at a far end of the optical transmission link or at one or more far ends of the passive optical network to extract the respective optical channel signals from the WDM signal received and on the spectrum of the optical channel signal of the respective neighboring channel, and the pre-distortion signal is subtracted from the modulation data signal, the spectrum of the optical channel signal of the respective neighboring channel used for determining the at least one pre-distortion component preferably being the spectrum of the optical channel signal which would be created without applying pre-distortion to the respective neighboring channel.

In this way, the amount of crosstalk to be compensated is determined. This can be done e.g. by spectral filtering of the interfering channel(s) to obtain the (high-frequency) portion of the crosstalk. Due to orthogonal launch, linear pre-distortion can be used, although a channel receiver device usually (due to the use of a photo-diode as opto-electrical conversion element) has a nonlinear characteristic. The proposed method is also robust to polarization-mode dispersion because the crosstalk of the neighboring channel will remain in an orthogonal polarization state, even if affected by polarization mode dispersion (PMD).

The at least one component of pre-distortion the signal may be determined by calculating, in the time domain, the convolution of the unit pulse response of the spectral optical filter function used to extract the optical channel signal of the respective channel from the digital WDM signal at the far end and the optical channel signal of the respective neighboring channel.

According to a simple-to-realize method of the invention, the at least one component of the pre-distortion signal is determined by calculating the absolute value of the convolution, i.e. the respective amount of power can be subtracted (electrically) from the driving voltage of a (single-arm) modulator, like a Mach Zehnder modulator. No complex IQ-modulator setup is required in order to implement this method of the invention.

Thus, in an embodiment that can easily be implemented, the at least one component of the pre-distortion signal can be determined, if a respective left or right neighboring channel signal is present, by calculating pre-distortion components according to partial pre-distortion functions $Xtalk_{(i-1),i}$ and $Xtalk_{(i+1),i}$ defined by $$Xtalk_{(i-1),i} = k \cdot |s_{i-1}(t) * f_i(t)|^2 \text{ and}$$

$$Xtalk_{(i+1),i} = k \cdot |s_{i+1}(t) * f_i(t)|^2$$

wherein i is the channel number of the respective channel signal to be pre-distorted, $s_{i-1}(t)$ is the optical channel signal of the left neighboring channel i−1, preferably without pre-distortion, $s_{i+1}(t)$ is the optical channel signal of the right neighboring channel i+1, preferably without pre-distortion, $f_i(t)$ is the unit pulse response of the spectral optical filter function used for detection of the optical channel signal of channel I, and k is a proportionality constant being preferably determined empirically or by using a simulation method.

In practice, the partial pre-distortion functions can be calculated by using a function for $s_{i\pm1}(t)$ which is equal to the respective modulation signal of the respective channel signal, i.e. the function of time in the base band (without the optical carrier signal). The function $f_i(t)$ is the unit pulse response of a "shifted filter" having a spectrum the shape of which is identical to the shape of the spectrum of the (unshifted) optical filter and the center frequency of which equals the center frequency of the (unshifted) optical filter minus the optical center (or carrier) frequency of the neighboring channel i±1. In this way, the calculation of the convolution can be simplified as the modulation signal of the respective neighboring channel can be directly used as function $s_{i\pm1}(t)$, and the function $f_i(t)$ can be replaced by a function $g_i(t)$ which is the unit pulse response of a "shifted filter" the spectrum of which can easily be determined from the known spectrum of the respective channel filter and the center frequency of the respective neighboring channel.

Of course, determining the partial pre-distortion functions $Xtalk_{(i-1),i}$ and $Xtalk_{(i+1),i}$ can also be done in the frequency domain, i.e. by transforming the function corresponding to the modulation signal of the neighboring channel into the frequency domain, multiplying this spectrum and the spectrum of the "shifted filter" and transforming back, into the time domain, the result of the multiplication. A variety of known (numerical) methods can be used to conduct the necessary calculations either in the time domain or in the frequency domain, so that it is unnecessary to describe possible practical implementations of appropriate calculation methods in greater detail.

As indicated above, either one or both directly neighboring channels can be taken into account in order to determine the total pre-distortion components to be subtracted from the actual modulation signal. Further, it is possible to additionally take into account the influence of higher order neighboring channels, i.e. channels which are spaced apart from the channel to be pre-distorted by more than a single frequency grid. The calculation of respective partial pre-distortion functions $Xtalk_{(i-j),i}$ and $Xtalk_{(i+j),i}$ (with $1 \leq j \leq N$ and $j \neq i$) can be effected analogously as described above. Instead of directly neighbored channel signals, only, selected or all signals $f_{i\pm j}(t)$ of the (directly and higher order) neighboring channels spaced by j-times the channel grid spacing from the respective channel i are taken into account.

According to a further embodiment, the ratio of the optical frequency grid spacing and the symbol rate of the channel signals is lower than 1. That is, the method of the invention is especially useful if the baud rate value is higher than the value of the channel grid frequency spacing.

In an optical WDM transmitter device according to the invention, which implements the method explained above, the polarizing means are preferably realized by using optical channel transmitter devices producing optical signals which are identically polarized and, for the optical channel transmitter devices of each second optical channel, providing a polarization device for changing the polarization of the respective optical channel signals into an orthogonal polarization.

Each of the optical channel transmitter devices preferably includes a controller device which receives the digital modulation data signal to be transmitted within the respective optical channel and which is adapted to add a pre-distortion signal including at least one pre-distortion component to the digital modulation data signal received. Of course, two or more of the controller devices may be realized as a single unit.

According to an embodiment of the optical WDM transmitter device, the controller device is adapted to receive the digital modulation data signal of at least one neighboring channel and to determine, as function of time, the least one pre-distortion component using the digital modulation data signal received and information concerning properties of the given spectral optical filter function for extracting the respective optical channel signal from the WDM signal, the at least one pre-distortion component being preferably determined such that it is directly proportional to the optical power of the optical channel signal of the respective neighboring optical channel falling within the optical channel of the respective optical channel transmitter device which is defined by the given spectral optical filter function.

The controller device may be adapted to determine the at least one component of the pre-distortion signal by implementing the method described above, especially with respect to the determination or calculation of the pre-distortion components.

In the following, the invention will be explained in greater detail with respect to an embodiment shown in the drawings.

DESCRIPTION OF ILLUSTRATIVE EMBODIMENTS

Figure 1:
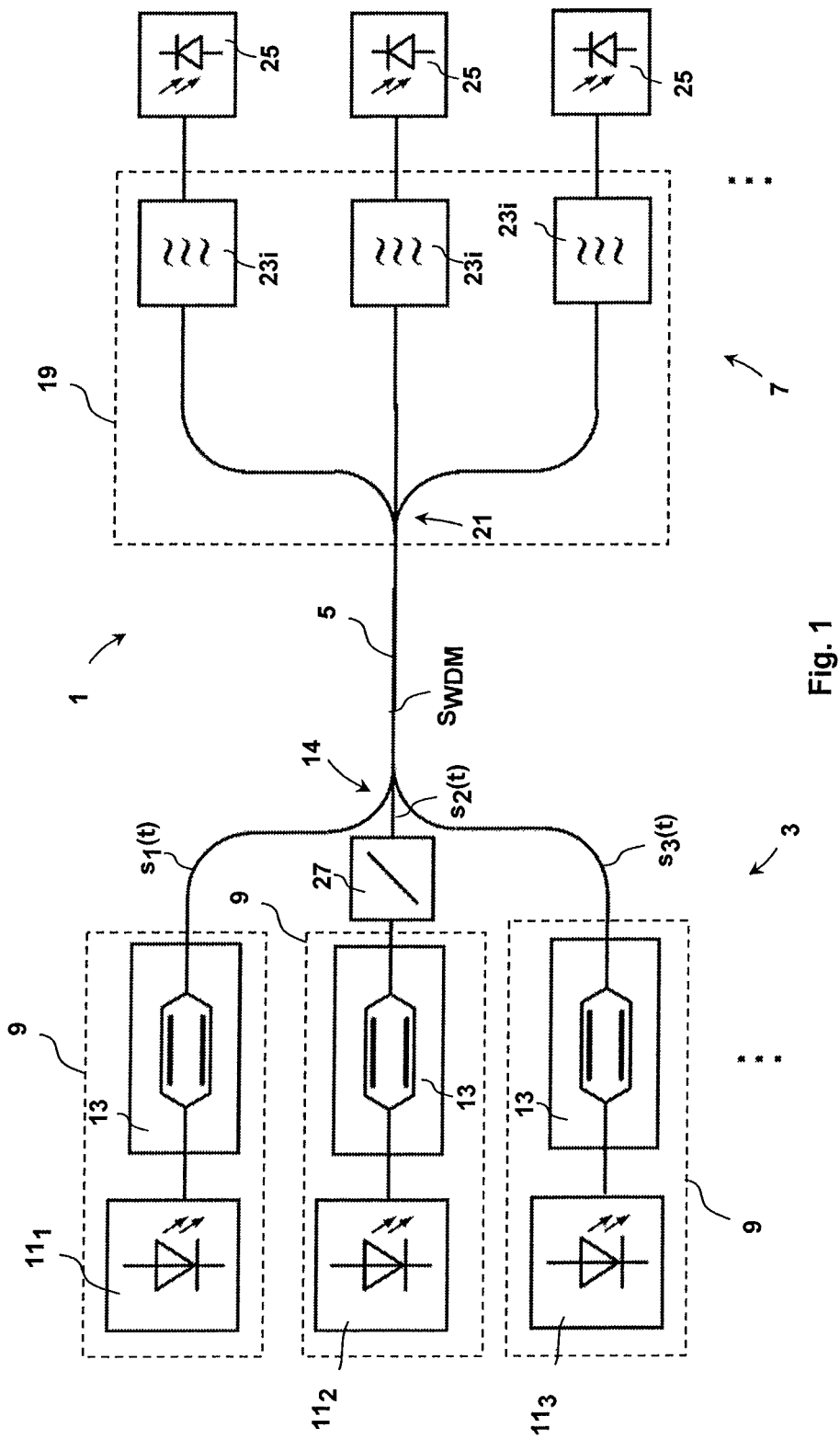
FIG. 1 shows a schematic block diagram of an optical WDM transmission system according to the invention.

FIG. 1 shows an optical WDM transmission system 1 including an optical WDM transmitter device 3, an optical transmission link 5 and an optical WDM receiver device 7. The WDM transmitter device 3 is connected to the transmission link 5 at a near end of the transmission link 5 and the WDM receiver device 7 is connected to a far end of the transmission link 5.

Although FIG. 1 shows a linear transmission link 5 comprising a single optical waveguide, only, the link 5 may also be an arbitrary optical path having a near end and a far end including passive optical components such as splitters, combiners and/or active optical components such as optical amplifiers. Moreover, the invention is not restricted to embodiments in which all optical channels are received at the far end of a transmission link. At the far end, an optical add-/drop multiplexer (OADM) may be present extracting one or more selected channels, only. That is, instead of a linear optical link an optical network (more precisely, a passive optical network apart from optical amplifiers) may be used to establish a communication for one or more selected optical channels between a selected near end and a selected far end provided by the optical network. In these embodiments, the optical WDM receiver device is a device including distributed optical channel receiver devices. In the same way, the optical WDM transmitting device may be distributed over several near ends of an optical network.

The optical WDM transmitter device 3 includes a number of N optical channel transmitter devices 9 for creating an optical channel signal having a predetermined optical carrier frequency, or, more precisely, having a given optical carrier spectrum. The optical channel signal s(t) ($0 \leq i \leq N$) created by each channel transmitter device 9 is a modulated optical signal. The modulation may be effected using known modulation methods for creating an optical channel signal that can be detected using direct detection methods.

As shown in FIG. 1, the optical channel signals $s_i(t)$ of the N channel transmitter devices 9 ($0 \leq i \leq N$) may be created by using an optical CW source $11_i$, e.g. a CW laser, having a suitable optical bandwidth and an optical modulator 13 receiving the respective optical CW signal. Each of the optical modulators 13 is adapted to modulate the optical CW signal according to a digital modulation data signal $s_{mod,i}(t)$ including the information to be transmitted within the respective channel signal $s_i(t)$ (see FIG. 2). The optical channel signals $s_i(t)$ are combined to an optical WDM signal $S_{WDM}$ by means of an optical multiplexer 14.

Figure 2:
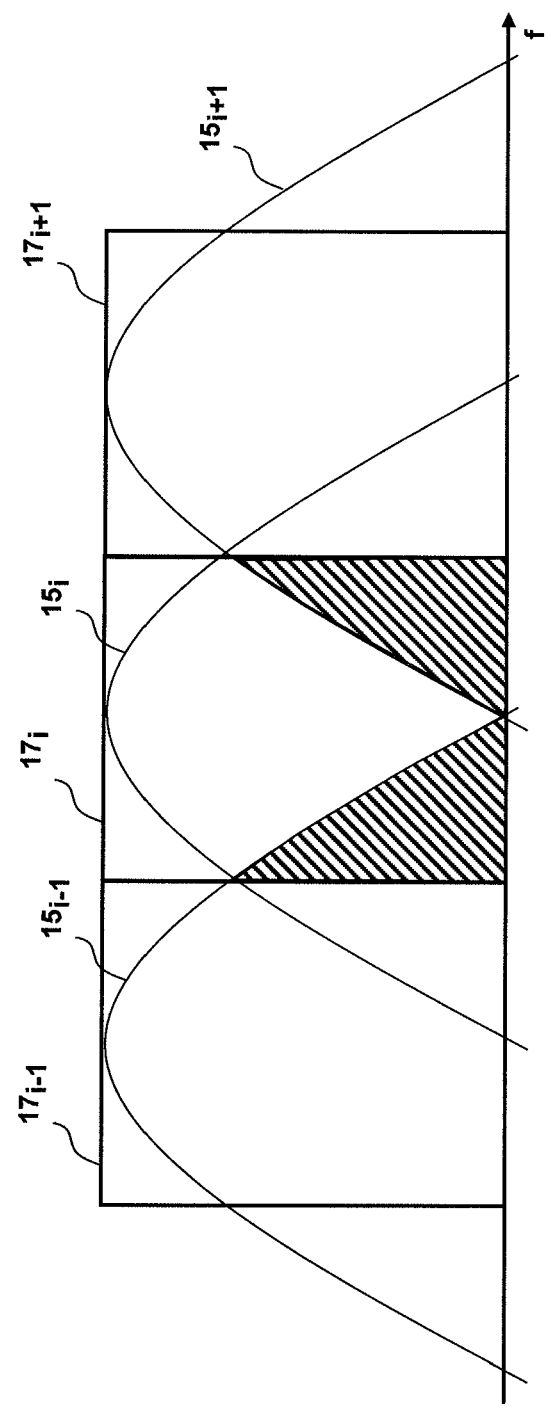
FIG. 2 shows a schematic diagram revealing the spectra (amplitude) of the filter functions for extracting the optical channel signals from the optical WDM signal and the spectra of the channel signals.

The optical channel signals $s_i(t)$ are spaced apart by a given (preferably essentially constant) frequency spacing with respect to their center frequencies of the optical amplitude spectrum according to a predefined grid for the optical WDM signal. The frequency spacing may e.g. be 25 GHz. If a high bitrate modulation data signal is used for neighboring channels, the channel signals overlap to a significant extent. This situation is shown in FIG. 2, in which the curves $15_{i-1}$, $15_i$, $15_{i+1}$ represent the amplitude spectra $S_{i-1}(f)$, $S_i(f)$ and $S_{i+1}(f)$ of respective channel signals $s_{i-1}(t)$, $s_i(t)$, $s_{i+1}(t)$ of an arbitrary channel number i and two directly neighboring channels number i−1 and i+1 of the optical WDM channel signal. Likewise, the rectangular-shaped curves $17_{i-1}$, $17_i$, $17_{i+1}$, designate amplitude spectra $F_{i-1}(f)$, $F_i(f)$ and $F_{i+1}(f)$ of optical filter functions (represented, in the time domain, by the unit pulse response functions $f_{i-1}(t)$, $f_i(t)$, $f_{i+1}(t)$ of the respective optical filter devices), which are used to demultiplex the optical WDM signals, i.e. to extract the optical channel signals from the WDM signal. To simplify matters, a rectangular shape of the filter functions $F_i$ shown in FIG. 2 has been chosen for easier visualization.

As apparent from FIG. 2, the channel spacing is extremely dense with respect to the bandwidth of the amplitude spectrum $F_i(f)$ of the optical channel signals, so a substantial portion of the amplitude spectra $F_{i-1}(f)$ and $F_{i+1}(f)$ of the optical channels i−1 and i+1 neighboring the optical channel M fall within the bandwidth of the amplitude spectrum of the filter function defined for channel M. This leads to an inacceptable amount of channel crosstalk, which makes it impossible to detect the optical channel signal using direct detection as used in the optical WDM transmission system 1 according to FIG. 1.

As shown in FIG. 1, the WDM receiver device 7 includes an optical demultiplexing device 19 comprising of an optical (power) splitter 21 for splitting the optical WDM signal into N optical paths, one for each optical channel. Within each of the optical paths an optical channel filter $23_i$ is provided realizing a corresponding filter function $f_i(t)$ and a corresponding amplitude spectrum $F_i(f)$ for extracting the optical channel $s_i(t)$ from the WDM signal. The optical channel signal in each path is detected by an optical detector 25 performing direct optical detection. This is a simple and thus inexpensive method for realizing optical channel receiver devices. However, there is no reduction of crosstalk at the receiver side.

Figure 4:
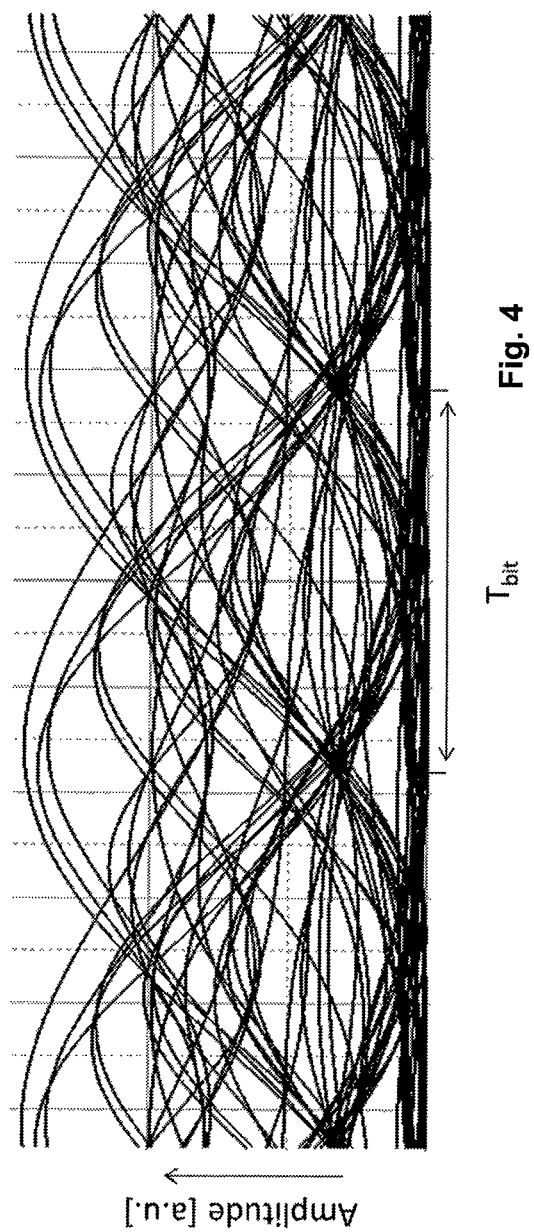
FIG. 4 shows a simulated eye diagram of an optical channel signal extracted from an optical WDM signal in an optical WDM transmission system according to FIG. 1 having two neighboring channels but without using orthogonal polarization for the neighboring channels of the optical WDM signal, the ratio of the channel grid frequency spacing and the baud rate having a value of 0.75, the optical channel signals being 28 Gb/s NRZ-OOK signals and using a third order Gaussian filter function to extract the optical channel signal from the WDM signal received.

Without any additional measure, it is impossible to use such simple and inexpensive optical receivers in dense WDM transmission systems. FIG. 4 shows a simulated eye diagram for a 28 Gb/s channel signal $s_i(t)$ received using direct detection, the channel signal using a non-return-to-zero (NRZ) line code and an on-off-keying (OOK) modulation. Further, for this simulation, a ratio of 0.75 of the channel grid spacing to the baud rate has been assumed as well as a third order Gaussian optical channel filter 25 having a FWHM bandwidth of 35 GHz. As apparent from FIG. 4, practically no reasonable detection of the channel signal is possible.

Therefore, it is proposed to introduce, as additional measure at the transmitter side, an orthogonal polarization of the optical channel signals created by the optical WDM transmitting device 3 such that each pair of neighboring optical channels transports optical channel signals $s_i(t)$ and $s_{i+1}(t)$ which are orthogonally polarized. Preferably, linear polarization is used as handling other polarization states like circular or even elliptical polarization is more complex. For this purpose, the CW signals of the optical sources $11_i$ for each optical channel number i may be created as a linearly polarized signal having the same polarization direction. Further, for each second channel, a polarization rotating means 27 may be used which rotates the plane polarization by 90°, resulting in orthogonal planes of polarization for (directly) neighboring optical channel signals $s_i(t)$ and $s_{i\pm1}(t)$ (if a neighboring channel signal exists). Of course, it is also possible to use polarization rotating means within each path of an optical channel signal which are configured to rotate the incoming channel signal such that the desired orthogonal polarization state is achieved for each two neighboring channels.

This measure leads to a drastic reduction of crosstalk when direct detection is used at the receiver side of the transmission system 1 as shown in FIG. 1 as the field vectors of the neighboring channel signals $s_{i\pm1}(t)$ merely influence the (current) polarization plane of the field vector (and thus, in a reduced manner, the length of the field vector or field strength). As an opto-electrical converter element, like a photo diode, detects the optical power of the signal received, i.e. the field strength is squared, using orthogonal polarization has no negative effects on the receiver side.

Figure 5:
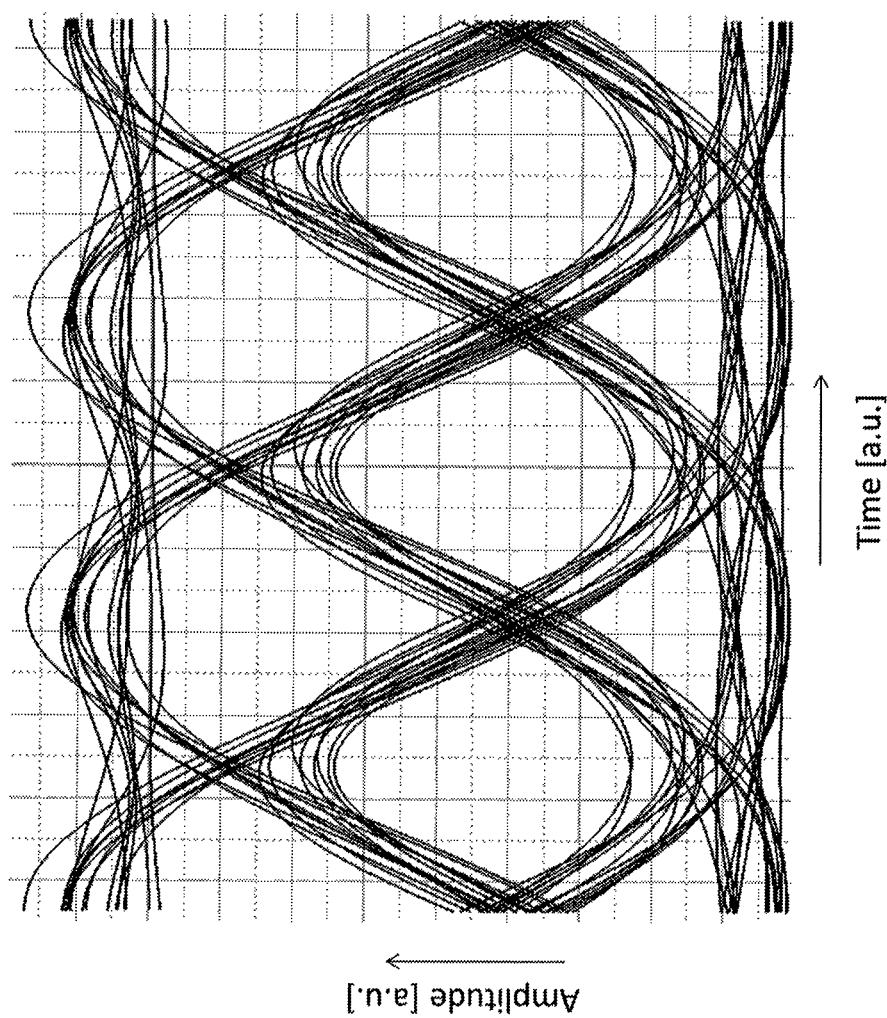
FIG. 5 shows a simulated eye diagram of an optical channel signal for the system in FIG. 4 wherein orthogonal polarization is used for neighboring channels of the optical WDM signal.

FIG. 5 shows a diagram similar to FIG. 4 in which orthogonal polarization of the two neighboring channels is simulated. As apparent, the eye of the diagram has opened to an extent that a reasonable detection of the digital optical channel signal $s_i(t)$ is made possible or facilitated.

In order to further improve the signal quality of a channel signal received (i.e. the opto-electrically converted optical channel signal), a pre-distortion of the optical channel signals $s_i(t)$ may be provided in addition to the orthogonal polarization of neighboring channels. Due to the use of orthogonal polarization launch, linear pre-distortion is sufficient.

The basic principle is to determine the optical power of a neighboring channel signal $s_{i-1}(t)$ or $s_{i+1}(t)$ that is detected by the optical channel receiver device 25 after having been filtered by the respective channel filter 23$_i$. This can be done by multiplying the respective filter amplitude spectrum $F_i(f)$ (curves 17$_i$ in FIG. 2) and amplitude spectrum of the $S_{i-1}(f)$ or $S_{i+1}(f)$ (curves 15$_{i-1}$ and 15$_{i+1}$, respectively). The result can be transformed into the time domain and the respective signal taken as absolute value can be weighted by a constant factor k and subtracted as pre-distortion component from the modulation data signal $s_{mod,i}(t)$.

As multiplication in the frequency domain equals a convolution in the time domain, this leads to the following relations describing partial pre-distortion functions $Xtalk_{(i-1),i}$ and $Xtalk_{(i+1),i}$ defined by $$Xtalk_{(i-1),i} = k \cdot |s_{i-1}(t) * f_i(t)|^2 \text{ and}$$

$$Xtalk_{(i+1),i} = k \cdot |s_{i+1}(t) * f_i(t)|^2$$

Here, it is to be mentioned that the factor k mainly depends on the properties of the respective optical modulator 13. As mentioned above, instead of calculating the convolutions, a multiplication of the respective spectra in the frequency domain and a subsequent inverse spectral transformation into the time domain is possible. For this, it would be possible to use a split-off portion of the neighboring optical channel signal and filter this signal using an optical filter having the same characteristics as the optical channel filter 23$_i$ at the receiver end.

However, it is more convenient to shift both functions $s_{i\pm 1}(t)$ and $f_i(t)$ into the baseband, i.e. shift both functions by the same value of $\Delta f$. As a result, the signal $s_{i\pm 1}(t)$ can be replaced by the modulation data signal $s_{mod,i\pm 1}(t)$ used for creating the respective channel signal $s_i(t)$ or, more precisely, by the pre-distorted modulation signal $s_{mod,pd,i\pm 1}(t)$ and the function $f_i(t)$ can be replaced by the unit pulse response function $g_i(t)$ of an optical channel filter the spectrum of which has been shifted by the same shift $\Delta f$. In case of a frequency grid having a constant frequency spacing the shifted filter function, in the frequency domain, is a band pass spectrum the center frequency of which is shifted versus the origin by a grid spacing.

As an approximation it is sufficient to use the modulation data signal $s_{mod,i\pm 1}(t)$ instead of the pre-distorted modulation signal $s_{mod,pd,i\pm 1}(t)$.

Figure 3:
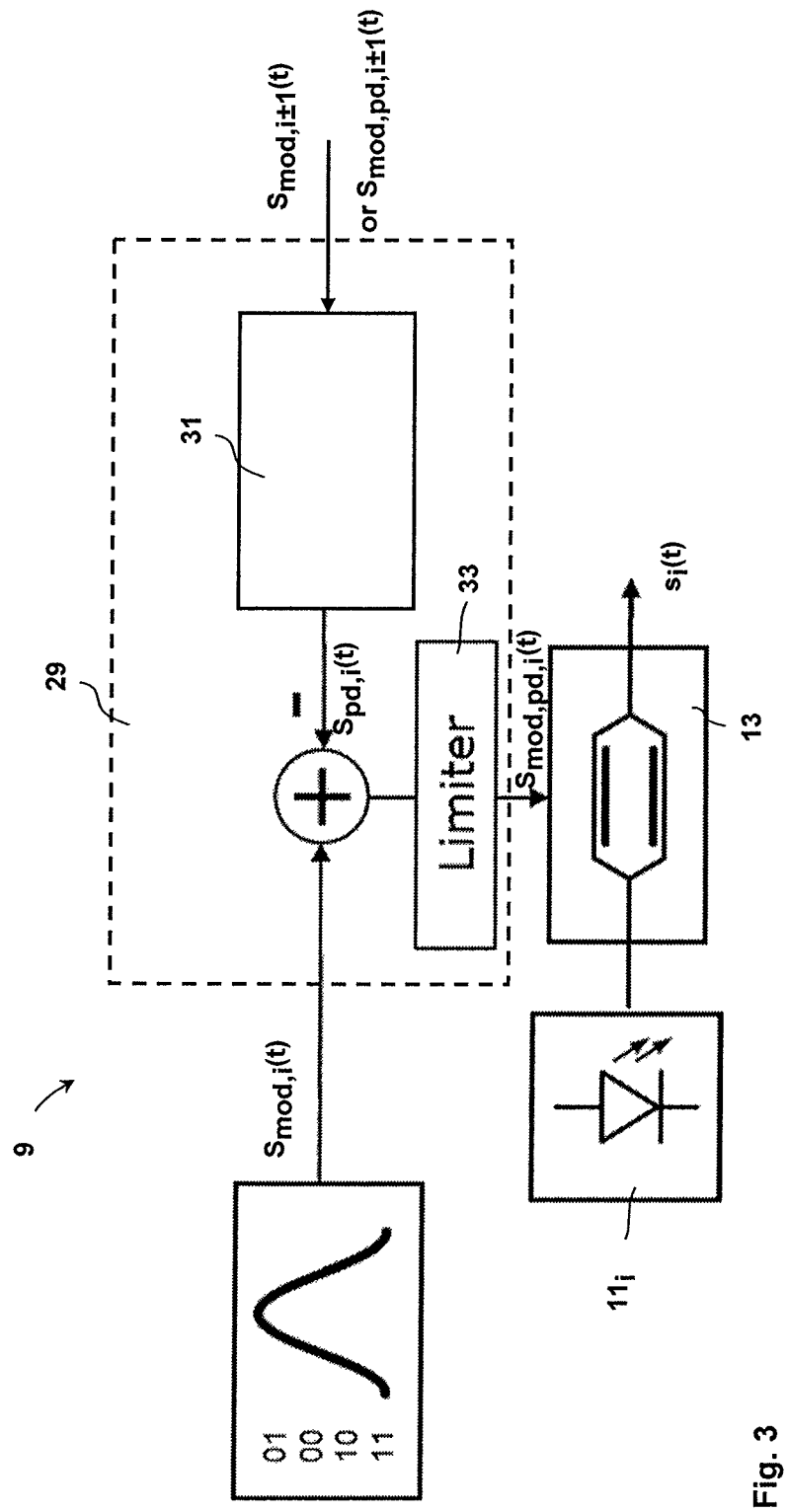
FIG. 3 shows an optical channel transmitter device of the optical WDM transmitter in FIG. 1 adapted to add a pre-distortion signal to the digital modulation data signal.

FIG. 3 shows a schematic block diagram of a modified optical channel transmitter device 9 which allows for pre-distortion of the channel signal $s_i(t)$ created by the optical CW source 11$_i$ and the modulator 13. In order to effect the desired pre-distortion, a controller device 29 is provided in each channel transmitter device 9. Of course, more or all controller devices 29 for the respective channels may be incorporated within a single unit, or the function of more or all controller devices 29 may be effected by a single unit. The controller device 29 receives at least one of the directly neighboring modulation signals $s_{mod,i\pm 1}(t)$ or at least one of the directly neighboring pre-distorted modulation signals $s_{mod,pd,i\pm 1}(t)$. A calculation unit 31, which has the information concerning the filter function $f_i(t)$ (either in the frequency or in the time domain) and the information concerning the proportionality factor k, determines a pre-distortion signal by calculating the partial pre-distortion functions $Xtalk_{(i-1),i}$ and $Xtalk_{(i+1),i}$. It is also possible for the calculation unit to calculate higher order pre-distortion functions in order to take into account the crosstalk due to channel signals having a frequency distance of two or more grid spacings. The pre-distortion signal $s_{pd,i}(t)$, which is preferably determined as the sum of the partial pre-distortion functions, is subtracted from the respective modulation signal $s_{mod,i}(t)$ in order to create the pre-distorted modulation signal $s_{mod,pd,i}(t)$ for channel i.

A limiter 33 may be used in order to restrict the pre-distorted modulation signal $s_{mod,pd,i}(t)$ to the signal limits admissible for the modulator 13.

Figure 6:
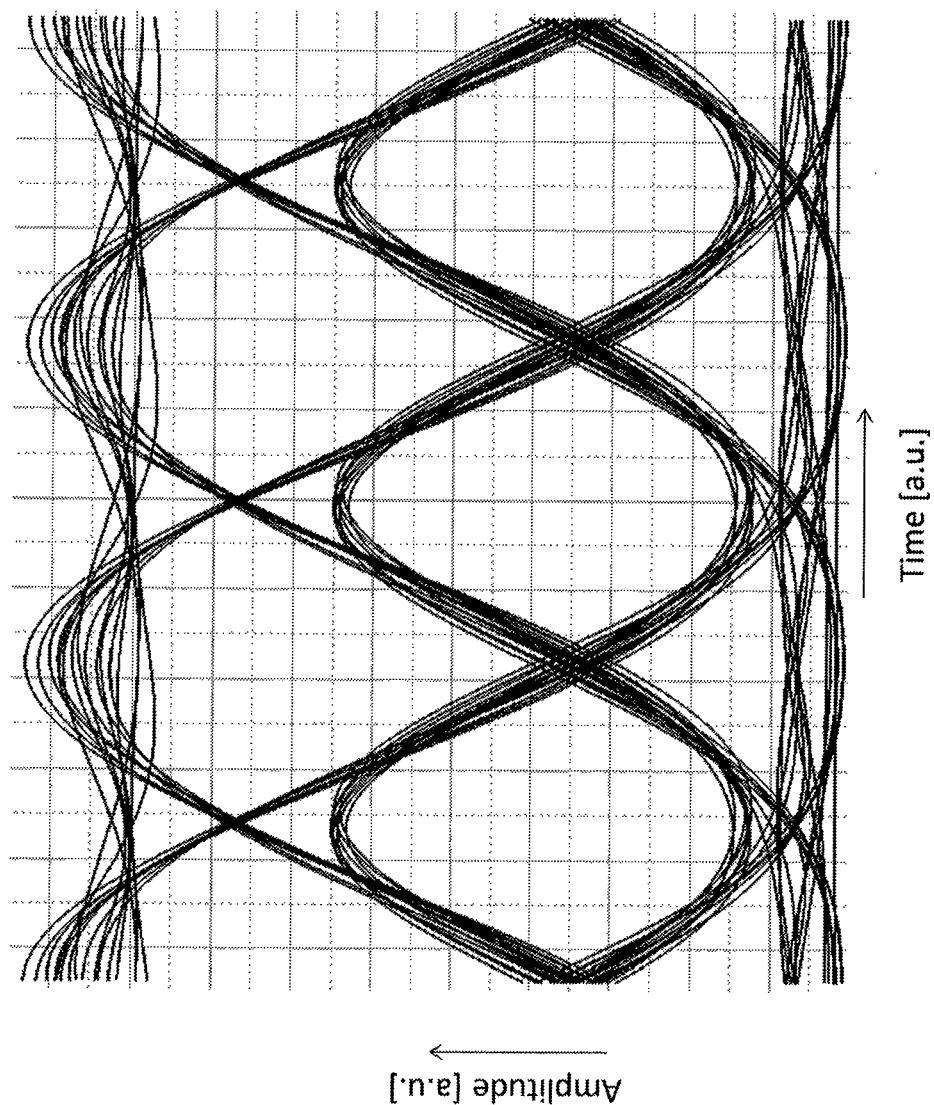
FIG. 6 shows a simulated eye diagram of an optical channel signal for the system in FIG. 5 wherein pre-distortion is used in addition to orthogonal polarization for the neighboring channels of the optical WDM signal.

A simulated eye diagram for two neighboring channels using this pre-distortion method is shown in FIG. 6. This simulation has again been based on the same conditions as have been used for the simulations in FIGS. 4 and 5. Due to the pre-distortion applied, a further significant improvement in the quality of the detected (electrical) signals is achieved. The eye opening (EOP) width is only 0.2 dB worse than the EOP achievable without crosstalk.

Thus, the invention is especially useful in a transmission scenario with densely spaced WDM channels, especially if the channel signals are generated in a photonic-integrated circuit (PIC) comprising lasers, modulators and a combiner. In such a PIC, orthogonal launch of the neighboring channels (which already reduces inter-channel crosstalk) can be implemented without much additional effort. On top of this, pre-compensation of the inter-channel crosstalk can further improve signal quality. Additionally, inter-channel crosstalk due to fiber nonlinearity in ultra-dense transmission is improved significantly by polarization orthogonal launch.

LIST OF REFERENCE SIGNS

1 optical WDM transmission system
3 optical WDM transmitter device
5 optical transmission link
7 optical WDM receiver device
9 optical channel transmitter device
11 optical CW source
13 optical modulator
14 optical multiplexer
15$_i$ curve of channel amplitude spectrum
17$_i$ curve of channel filter function (amplitude spectrum)
19 optical demultiplexing device
21 optical splitter
23$_i$ optical channel filter I ($0 \leq I \leq N$)
25 optical detector
27 polarization rotating means
29 controller device
31 calculation unit
33 limiter
$\Delta f$ grid spacing
$f_i(t)$ unit pulse response of the filter function used in optical channel i ($0 \leq i \leq N$)
$g_i(t)$ unit pulse response of the shifted filter function $f_i(t)$ ($0 \leq i \leq N$)
$F_i(f)$ amplitude spectrum of unit pulse response of filter function $f_i(t)$
$S_{WDM}$ optical WDM signal
$s_i(t)$ optical channel signal of channel I ($0 \leq i \leq N$)
$S_i(f)$ amplitude spectrum of optical channel signal $s_i(t)$
$s_{mod,i}(t)$ modulation signal for channel i ($0 \leq i \leq N$)
$s_{pd,i}(t)$ pre-distortion signal for channel i
$s_{mod,pd,i}(t)$ pre-distorted modulation signal for channel I ($0 \leq i \leq N$)

The invention claimed is:
1. A method for transmitting an optical digital WDM (wavelength division multiplex) signal over an optical transmission link or a passive optical network, the optical digital

WDM signal ($S_{WDM}$) including N optical channels matching a given optical frequency grid, the method comprising:

(a) supplying the optical digital WDM signal ($S_{WDM}$) to a near end of the optical transmission link or a near end of the passive optical network;

(b) receiving the optical digital WDM signal ($S_{WDM}$) at a far end of the optical transmission link or at one or more far ends of the passive optical network;

(c) separating optical channel signals ($s_i(t)$) from the optical digital WDM signal ($S_{WDM}$) by splitting and bandpass filtering the optical digital WDM signal ($S_{WDM}$) received; and (d) converting the optical channel signals ($s_i(t)$) into electrical channel signals using direct optical detection;

(e) the optical digital WDM signal ($S_{WDM}$) is created such that neighboring channel signals ($s_i(t)$) are orthogonally polarized;

(f) applying pre-distortion for creating the optical channel signals ($s_i(t)$) by adding a pre-distortion signal ($s_{pd,i}(t)$) to a respective digital modulation data signal ($s_{mod,i}(t)$) which is used for creating the respective optical channel signal ($s_i(t)$), the pre-distortion signal ($s_{pd,i}(t)$) including at least one pre-distortion component depending on the optical channel signal ($s_{i\pm j}$) of a neighboring channel; and (g) wherein the at least one pre-distortion component is dependent on the overlap of the spectral optical filter function ($F_i(f)$) used at the far end of the optical transmission link or at one or more far ends of the passive optical network to extract the respective optical channel signals ($s_i(t)$) from the optical digital WDM signal ($S_{WDM}$) received and on the spectrum of the optical channel signal ($s_{i\pm j}$)) of the respective neighboring channel, and wherein the pre-distortion signal $s_{pd,i}(t)$) is subtracted from the modulation data signal ($s_{mod,i}(t)$).

2. The method of claim 1 wherein the spectrum of the optical channel signal ($s_{i\pm j}(t)$) of the respective neighboring channel used for determining the at least one pre-distortion component comprises the spectrum of the optical channel signal ($s_i(t)$) which would be created without applying pre-distortion to the respective neighboring channel.

3. The method of claim 1 wherein the at least one component of the pre-distortion signal ($s_{pd,i}(t)$) is determined by calculating, in the time domain, the convolution of the unit pulse response ($f_i(t)$) of the spectral optical filter function used to extract the optical channel signal of the respective channel from the optical digital WDM signal ($S_{WDM}$) at the far end and the optical channel signal ($s_{i\pm j}$)) of the respective neighboring channel.

4. The method of claim 3 wherein the at least one component of the pre-distortion signal ($s_{pd,i}(t)$) is determined by calculating the absolute value of the convolution.

5. The method of claim 3 wherein the at least one component of the pre-distortion signal ($s_{pd,i}(t)$) is determined, if a respective left or right neighboring channel signal ($s_{i\pm j}(t)$) is present, by calculating pre-distortion components according to partial pre-distortion functions $Xtalk_{(i-1),i}$ and $Xtalk_{(i+1),i}$ defined by $$Xtalk_{(i-1),i} = k \cdot |s_{i-1}(t) * f_i(t)|^2 \text{ and}$$

$$Xtalk_{(i+1),i} = k \cdot |s_{i+1}(t) * f_i(t)|^2$$

wherein i is the channel number of the respective channel signal to be pre-distorted, $s_{i-1}(t)$ is the optical channel signal of the left neighboring channel i−1, $s_{i+i}(t)$ is the optical channel signal of the right neighboring channel i+1, $f_i(t)$ is the unit pulse response of the spectral optical filter function used for detection of the optical channel signal of channel I, and k is a proportionality constant being determined empirically or using a simulation method.

6. The method of one of claim 5 wherein the ratio of the optical frequency grid spacing ($\Delta f$) and the symbol rate of the channel signals ($s_i(t)$) is lower than 1.

7. The method of claim 1 wherein the ratio of the optical frequency grid spacing ($\Delta f$) and the symbol rate of the channel signals ($s_i(t)$) is lower than 1.

8. An optical WDM (wavelength division multiplex) transmitter device for creating and transmitting an optical digital WDM signal ($S_{WDM}$) over an optical transmission link or a passive optical network, the optical digital WDM signal ($S_{WDM}$) including N optical channels matching a given optical frequency grid and each of the optical channel signals being detected by an optical receiver device performing a direct optical detection method, each optical receiver device using an optical band filter device having a given spectral optical filter function for extracting the optical channel signal from the optical digital WDM signal ($S_{WDM}$), the optical WDM transmitter device including:

(a) for each optical channel, an optical channel transmitter device for creating a respective digital optical channel signal ($s_i(t)$), which is modulated according to a digital modulation data signal ($s_{mod,i}(t)$);

(b) an optical multiplexer device for combining the optical channel signals, which are supplied to respective channel ports of the optical multiplexer device, into the optical digital WDM signal ($S_{WDM}$), which is provided at an output port of the optical multiplexer device, the output port being configured to be connected to a near end of the optical transmission link or a near end of the passive optical network;

(c) means for polarizing the optical channel signals such that neighboring channel signals are orthogonally polarized;

(d) wherein each of the optical channel transmitter devices includes a controller device which receives the digital modulation data signal ($s_{mod,i}(t)$) for the respective optical channel and which is configured to add a pre-distortion signal ($s_{pd,i}(t)$) including at least one pre-distortion component to the digital modulation data signal ($s_{mod,i}(t)$) received; and (e) wherein the controller device is configured to receive the digital modulation data signal ($s_{mod,i\pm1}(t)$) of at least one neighboring channel and to determine, as function of time, the at least one pre-distortion component using the digital modulation data signal ($s_{mod,i}(t)$) of the at least one neighboring channel and information concerning properties of the given spectral optical filter function for extracting the respective optical channel signal from the WDM signal ($S_{WDM}$).

9. The optical WDM transmitter device of claim 8 wherein the polarizing means include optical channel transmitter devices producing optical signals which are identically polarized and, for the optical channel transmitter devices of each second optical channel, a polarization device for changing the polarization of the respective optical channel signals into an orthogonal polarization.

10. The optical WDM transmitter device of claim 8 wherein the controller device is configured to determine the at least one component of the pre-distortion signal ($s_{pd,i}(t)$) by calculating, in the time domain, the convolution of the unit pulse response of the spectral optical filter function ($f_i(t)$) and the optical channel signal ($s_{i\pm1}(t)$) of the respective neighboring channel, the optical channel signal used to determine the at least one component of the pre-distortion signal comprising the optical channel signal which would be created without applying pre-distortion.

11. The optical WDM transmitter device of claim 10 wherein the controller device is configured to determine the at least one component of the pre-distortion signal ($s_{pd,i}(t)$) by calculating the absolute value of the convolution.

12. The optical WDM transmitter device of claim 11 wherein the controller device is configured to calculate, if a respective left and/or right directly neighboring channel signal ($s_{i\pm1}(t)$) is present, respective pre-distortion components according to partial pre-distortion functions $\text{Xtalk}_{(i-1),i}$ and $\text{Xtalk}_{(i+1),i}$ defined by $$\text{Xtalk}_{(i-1),i} = k \cdot |s_{i-1}(t) * f_i(t)|^2 \text{ and}$$

$$\text{Xtalk}_{(i+1),i} = k \cdot |s_{i+1}(t) * f_i(t)|^2$$

wherein i is the channel number of the respective channel signal to be pre-distorted, $s_{i-1}(t)$ is the optical channel signal of the left neighboring channel i−1 without pre-distortion, $s_{i+1}(t)$ is the optical channel signal of the right neighboring channel i+1 without pre-distortion, $f_i(t)$ is the unit pulse response of the spectral optical filter function used for detection of the optical channel signal of channel I, and k is a proportionality constant being determined empirically or by using a simulation method, and wherein the controller device is configured to subtract the partial pre-distortion functions $\text{Xtalk}_{(i-1),i}$ and $\text{Xtalk}_{(i+1),i}$ as pre-distortion components from the digital modulation data signal ($s_{mod,i}(t)$) for the respective optical channel.

13. The optical WDM transmitter device of claim 8 wherein the controller device is configured to determine the at least one component of the pre-distortion signal ($s_{pd,i}(t)$) by calculating, in the time domain, the convolution of the unit pulse response of the spectral optical filter function ($f_i(t)$) and the optical channel signal ($s_{i\pm1}(t)$) of the respective neighboring channel, the optical channel signal used to determine the at least one component of the pre-distortion signal comprising the optical channel signal which would be created without applying pre-distortion.

14. An optical WDM (wavelength division multiplex) transmission system for transmitting an optical digital WDM signal ($S_{WDM}$) over an optical transmission link or a passive optical network, the optical digital WDM signal ($S_{WDM}$) including N optical channels matching a given optical frequency grid, the optical WDM transmission system including:
  (a) an optical WDM transmitter device connectable to a near end of the optical transmission link or a near end of the passive optical network and
  (b) an optical WDM receiver device including
    (i) an optical demultiplexing device provided at a far end of the optical transmission link or at one or more far ends of the passive optical network, the optical demultiplexing device defining, for each optical channel, an optical spectral filter function for extracting the respective optical channel signal from the optical digital WDM signal ($S_{WDM}$), and
    (ii) an optical channel receiver device for each optical channel configured to directly receive an optical channel signal ($s_i(t)$) extracted from the optical digital WDM signal ($S_{WDM}$) at a far end of the optical transmission link or at a far end of the passive optical network, wherein the optical WDM transmitter device includes:
  (c) for each optical channel, an optical channel transmitter device for creating a respective digital optical channel signal ($s_i(t)$), which is modulated according to a digital modulation data signal ($s_{mod,i}(t)$);
  (d) an optical multiplexer device for combining the optical channel signals, which are supplied to respective channel ports of the optical multiplexer device, into the optical digital WDM signal ($S_{WDM}$), which is provided at an output port of the optical multiplexer device, the output port being configured to be connected to the near end of the optical transmission link or the near end of the passive optical network;
  (e) means for polarizing the optical channel signals such that neighboring channel signals are orthogonally polarized;
  (f) wherein each of the optical channel transmitter devices includes a controller device which receives the digital modulation data signal ($s_{mod,i}(t)$) for the respective optical channel and which is configured to add a pre-distortion signal ($s_{pd,i}(t)$) including at least one pre-distortion component to the digital modulation data signal ($s_{mod,i}(t)$) received; and
  (g) wherein the controller device is configured to receive the digital modulation data signal ($s_{mod,i\pm1}(t)$) of at least one neighboring channel and to determine, as function of time, the at least one pre-distortion component using the digital modulation data signal ($s_{mod,i}(t)$) of the at least one neighboring channel and information concerning properties of the given spectral optical filter function for extracting the respective optical channel signal from the optical digital WDM signal ($S_{WDM}$).

15. The optical WDM transmission system of claim 14 wherein the polarizing means of the optical WDM transmitter device include optical channel transmitter devices producing optical signals which are identically polarized and, for the optical channel transmitter devices of each second optical channel, a polarization device for changing the polarization of the respective optical channel signals into an orthogonal polarization.

16. The optical WDM transmission system of claim 14 wherein the controller device is configured to determine the at least one component of the pre-distortion signal ($s_{pd,i}(t)$) by calculating, in the time domain, the convolution of the unit pulse response of the spectral optical filter function ($f_i(t)$) and the optical channel signal ($s_{i\pm1}(t)$) of the respective neighboring channel, the optical channel signal used to determine the at least one component of the pre-distortion signal comprising the optical channel signal which would be created without applying pre-distortion.

17. The optical WDM transmission system of claim 16 wherein the controller device is configured to determine the at least one component of the pre-distortion signal ($s_{pd,i}(t)$) by calculating the absolute value of the convolution.

18. The optical WDM transmission system of claim 17 wherein the controller device is configured to calculate, if a respective left and/or right directly neighboring channel signal ($s_{i\pm1}(t)$) is present, respective pre-distortion components according to partial pre-distortion functions $\text{Xtalk}_{(i-1),i}$ and $\text{Xtalk}_{(i+1),i}$ defined by $$\text{Xtalk}_{(i-1),i} = k \cdot |s_{i-1}(t) * f_i(t)|^2 \text{ and}$$

$$\text{Xtalk}_{(i+1),i} = k \cdot |s_{i+1}(t) * f_i(t)|^2$$

wherein i is the channel number of the respective channel signal to be pre-distorted, $s_{i-1}(t)$ is the optical channel signal of the left neighboring channel i−1 without pre-distortion, $s_{i+1}(t)$ is the optical channel signal of the right neighboring channel i+1 without pre-distortion, $f_i(t)$ is the unit pulse response of the spectral optical filter function used for detection of the optical channel signal of channel I, and k is a proportionality constant being determined empirically or by using a simulation method, and wherein the controller device is configured to subtract the partial pre-distortion functions $Xtalk_{(i-1),i}$ and $Xtalk_{(i+1),i}$ as pre-distortion components from the digital modulation data signal ($s_{mod,i}(t)$) for the respective optical channel.

* * * * *

UNITED STATES PATENT AND TRADEMARK OFFICE
CERTIFICATE OF CORRECTION

PATENT NO. : 9,219,523 B2
APPLICATION NO. : 14/081756
DATED : December 22, 2015
INVENTOR(S) : Michael Eiselt and Stephan Packnicke It is certified that error appears in the above-identified patent and that said Letters Patent is hereby corrected as shown below:

In the Specification:

At column 1, line 39: change "see e.g. No." to --see e.g.--.

At column 6, line 5: change "comprising of" to --comprising--.

In the Claims:

At column 9, line 24: change "$(s_{i\pm j}))$" to --$(s_{i\pm j}(t))$--.

At column 9, line 33: change "$(s_{i\pm j}))$" to --$(s_{i\pm j}(t))$--.

At column 9, line 48: change "$(s_{i\pm j}))$" to --$(s_{i\pm j}(t))$--.

At column 9, line 55: change "$(s_{i\pm j}))$" to --$(s_{i\pm j}(t))$--.

Signed and Sealed this
Ninth Day of August, 2016

Michelle K. Lee
*Director of the United States Patent and Trademark Office*